(12) United States Patent
Tan et al.

(10) Patent No.: US 12,397,228 B2
(45) Date of Patent: Aug. 26, 2025

(54) COMMUNICATION WITH IN-GAME CHARACTERS

(71) Applicants:Jocelyn Tan, San Jose, CA (US); Sean Rossi, Pinole, CA (US)

(72) Inventors: Jocelyn Tan, San Jose, CA (US); Sean Rossi, Pinole, CA (US)

( * ) Notice: Subject to any disclaimer, the term of this patent is extended or adjusted under 35 U.S.C. 154(b) by 249 days.

(21) Appl. No.: 18/347,394

(22) Filed: Jul. 5, 2023

(65) Prior Publication Data
US 2024/0009559 A1    Jan. 11, 2024

Related U.S. Application Data

(63) Continuation-in-part of application No. 16/989,171, filed on Aug. 10, 2020, now Pat. No. 11,691,076.

(51) Int. Cl.
| | | |
|---|---|---|
| *A63F 13/424* | (2014.01) | |
| *A63F 13/533* | (2014.01) | |
| *A63F 13/58* | (2014.01) | |
| *G10L 15/02* | (2006.01) | |
| *G10L 15/08* | (2006.01) | |
| *G10L 15/22* | (2006.01) | |
| *A63F 13/355* | (2014.01) | |

(52) U.S. Cl.
CPC .......... *A63F 13/424* (2014.09); *A63F 13/533* (2014.09); *A63F 13/58* (2014.09); *G10L 15/02* (2013.01); *G10L 15/08* (2013.01); *G10L 15/22* (2013.01); *A63F 13/355* (2014.09); *A63F 2300/8082* (2013.01); *G10L 2015/027* (2013.01); *G10L 2015/088* (2013.01); *G10L 2015/223* (2013.01)

(58) Field of Classification Search
CPC ......... G10L 25/24; G10L 25/30; G10L 15/16; G10L 15/142; G10L 15/02; G10L 15/1815; G10L 15/14; G10L 15/197; G10L 25/27; G10L 19/005; G10L 19/00; G10L 15/12; G10L 15/22; G10L 15/26; G10L 15/20; G10L 15/08; G10L 15/30; G10L 15/1822; G10L 15/183; G10L 15/19; G10L 15/193; G06F 3/011; G06T 19/006; A63F 13/424; A63F 13/533
See application file for complete search history.

(56) References Cited

U.S. PATENT DOCUMENTS

2022/0040581 A1 *    2/2022    Tan .................. G10L 15/22

* cited by examiner

*Primary Examiner* — Vu B Hang
(74) *Attorney, Agent, or Firm* — Cynthia S. Lamon; Lamon Patent Services

(57) ABSTRACT

A method for coordinating reactions of a virtual character with script spoken by a user involves specifying keywords in the script, making a first prediction of times for individual keywords and for responses by a virtual character, displaying the script, sensing the time that the user reaches a first keyword, recalculating the predictions based on the syllables in the script the time the user reaches the first keyword, sensing the time that the user reaches a second keyword, recalculating the predictions of times based on the syllables and time to second keyword, continuing to sense times and recalculating until a last keyword is reached, and causing specific actions and responses of the virtual character according to the recalculated predictions of times.

8 Claims, 9 Drawing Sheets

COMMUNICATION WITH IN-GAME CHARACTERS

CROSS-REFERENCE TO RELATED APPLICATIONS

The present application is a Continuation-in-Part of co-pending application Ser. No. 16/989,171, filed Aug. 10, 2020. The disclosures of the parent case is incorporated herein at least by reference.

BACKGROUND OF THE INVENTION

1. Field of the Invention

The present invention is in the technical area of virtual reality systems, and pertains more particularly to communication by players with in-game characters.

2. Description of Related Art

Virtual reality systems and video games based on such systems are well known in the art. In the latest technology, on-line enterprises stream video games to players, also termed users in this specification, from game servers and streams to users are updated based on actions by the users, such as moving an avatar in a game.

In some games and in some other VR circumstances, it may be desired that a user speak directly to a VR character, and for the character to respond to the user's input in some manner, such as by a returned communication, by an action, or by a series of actions. As a very simple example, a character may be programmed to turn a somersault in the video triggered by a voice input by a user. The voice input may be in a situation where there is one user and one character, for example a user might say "turn a somersault". It is, of course, necessary that the system at the game server understand the voice input and meaning from the user.

In conventional technology the interaction between a user and the system in such a circumstance requires substantial computer resources. Typically, there must be a voice-recognition system to resolve the audio input to a word or a phrase, and a library of words and phrases used for matching and triggering the programmed reaction of the character. In many circumstances the situation may be a multi-player game, and there may also be multiple characters in the game; if this is the case, then the challenge at the server is even greater because the server has to know the user and because there must be recognizable input from the user to identify the character being addressed so that the right character may be triggered to perform the response or responses.

What is clearly needed is an improvement wherein input from the user may be understood and managed by the system without need for voice recognition or libraries of words and phrases.

BRIEF SUMMARY OF THE INVENTION

In one embodiment of the invention a method for coordinating reactions of a virtual character with script spoken by a user in any one of a video game and virtual reality (VR) presentation is provided, comprising uniquely specifying specific keywords in the script, making a first prediction of times for reaching individual keywords and for triggering responses by a virtual character, displaying the script for the user on a display of a computerized platform used by the user, and prompting the player to speak the script, sensing the time that the user reaches a first keyword, recalculating the prediction of times for reaching individual following keywords and for triggering responses by a virtual character, based on the syllables in the script up to the first keyword and the actual time the user reaches the first keyword, sensing the time that the user reaches a second keyword, recalculating the prediction of times for reaching individual following keywords and for triggering responses by a virtual character, based on the syllables in the script up to the second keyword and the actual time the user reaches the second keyword, continuing to sense times to keywords and recalculating the predicted times until a last keyword is reached, and causing specific actions and responses of the virtual character according to the recalculated predictions of times.

In one embodiment the method further comprises a step for determining a start of a dialogue, wherein the system associates viewpoint of the player with a specific virtual character in the video game or VR presentation and selects a script accordingly. Also, in one embodiment the method further comprises a step for sensing that the dialogue is finished. And in one embodiment the method further comprises a step of playing any one of a verbal reaction and at least facial physical movement by the virtual character after the end of dialogue is sensed.

In another aspect of the invention a system coordinating reactions of a virtual character with script spoken by a player in any one of a video game or VR presentation is provided, comprising an internet-connected server executing software and streaming video games or presentations, an internet-connected computerized platform used by a user, the platform having a display, a command input interface, and a microphone, wherein the system uniquely specify specific keywords in the script, makes a first prediction of times for reaching individual keywords and for triggering responses by a virtual character, displays the script for the user on a display of a computerized platform used by the user, and prompts the user to speak the script, senses the time that the user reaches a first keyword, recalculates the prediction of times for reaching individual following keywords and for triggering responses by a virtual character, based on the syllables in the script up to the first keyword and the actual time the user reaches the first keyword, senses the time that the user reaches a second keyword, recalculates the prediction of times for reaching individual following keywords and for triggering responses by a virtual character, based on the syllables in the script up to the second keyword and the actual time the user reaches the second keyword, continues to sense times to keywords and recalculates the predicted times until a last keyword is reached, and causes specific actions and responses of the virtual character according to the recalculated predictions of times.

In one embodiment the system further comprises determining a start of a dialogue, wherein the system associates viewpoint of the player with a specific virtual character in the video game or VR presentation and selects a script accordingly. Also, in one embodiment the system determines the dialogue is finished. And in one embodiment the system further comprises playing any one of a verbal reaction and at least facial physical movement by the virtual character after the end of dialogue is sensed.

DETAILED DESCRIPTION OF THE INVENTION

Figure 1:
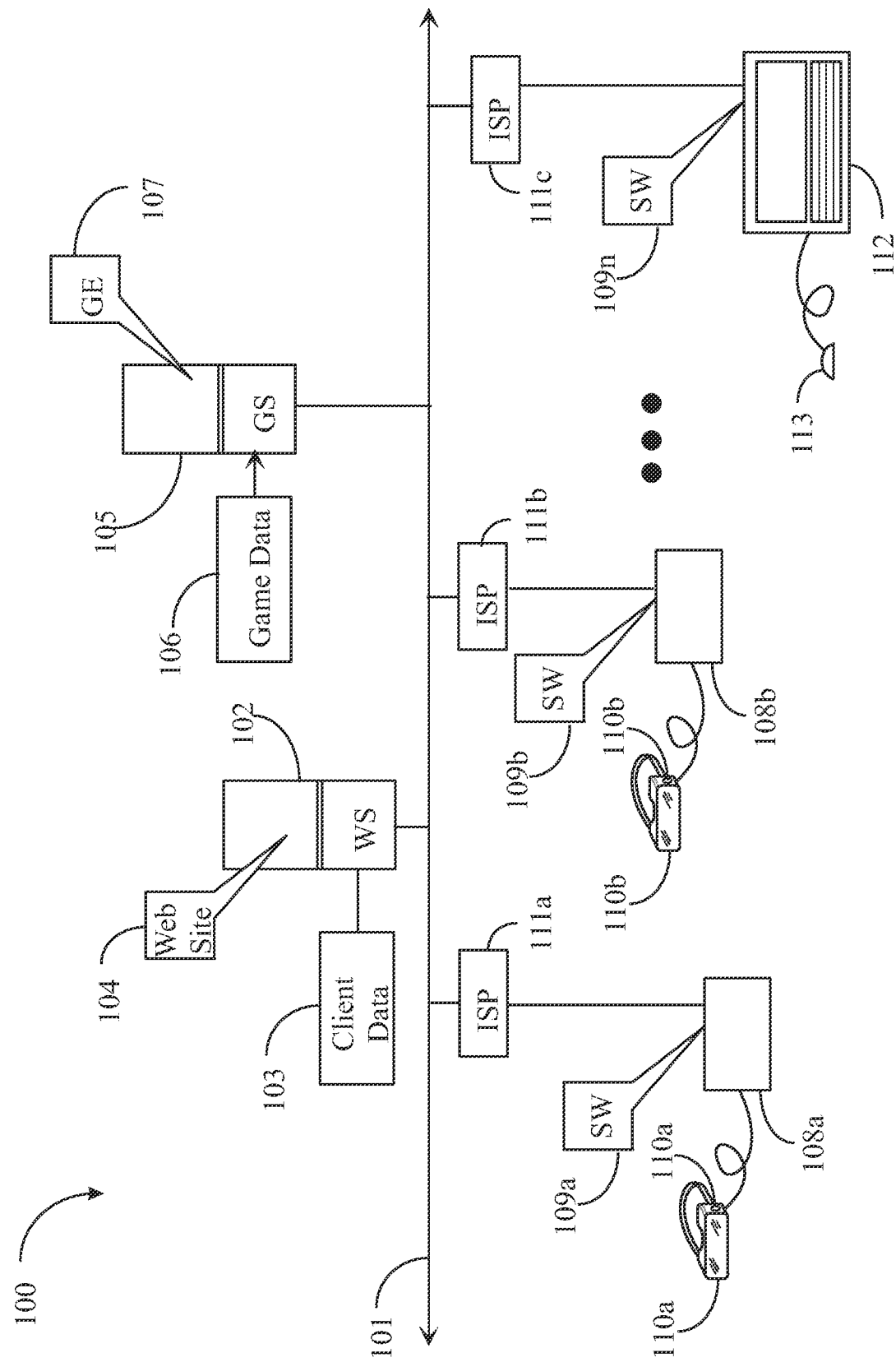
FIG. 1 is an architectural diagram in an embodiment of the invention.

FIG. 1 is an architectural diagram 100 in an embodiment of the invention. Line 101 in the figure represents the well-known Internet network and all subnetworks and components of the Internet. An Internet-connected server 102 coupled to a data repository 103 executing software 104 provides a web site in this example for a video gaming enterprise. Data repository 103 stores client data among other data; in one example repository 103 stores profiles for registered members of the enterprise who are regular players of video games streamed by the enterprise from game servers, such as, server 105 connected to the Internet, executing software 107 including a game engine, and storing and processing games and game data in a coupled data repository 106.

In this example the gaming enterprise hosting server 102 and 105 stream games to players using game platforms such as computerized appliance 108a executing software 109a, communicating with the enterprise servers through an Internet service provider (ISP) 111a. Platform 108a has a connected head-mounted display 110a with input interface 110b through which a player inputs commands during game play. This head-mounted display may also comprise a gyroscope or other apparatus for determining the head position of the player wearing the display. This is input the system may be used to decide where the user may be looking. The skilled person will understand that ISP 111a is a generalized representation meaning to encompass all of the many ways that a gaming platform may connect to the Internet network.

A second player platform 108b executing software 109b communicates through an ISP 111b and provides a head-mounted display 110c with input interface 111d for a second player. And a third platform 113 with a display and a keyboard 112 has a pointer (not shown) executes software 109n and communicates through an ISP 111c.

The representations of the gaming platforms are meant to illustrate a substantial number of such platforms that may be communicating with the gaming enterprise servers in parallel with a number of players, some of whom may be engaged in multi-player games streamed by the enterprise servers. The skilled person will also understand that, in some circumstances, games may be stored locally and played with local software from data repositories at the individual gaming platforms.

The skilled person will also understand the general process in the playing of video games and in other instances of individual users at local platforms interacting with virtual reality presentations. The general circumstance is that a user (player) at a gaming platform has a display, which may be a head-mounted display as illustrated in FIG. 1, and has an input interface through which the player may input commands. A virtual reality presentation is presented on the display which may provide animated virtual characters typically termed avatars in the art. The player interacts with the game and may be associated with a specific avatar such that the player may input commands to move the avatar, and then the game engine receives the commands and manipulates the game data to move the avatar and stream new data to the player and/or other players in a multiplayer game so that the avatar is seen to move in the display.

In some circumstances it may be desirable to provide programming wherein a player may engage in direct voice communication with an avatar, and that avatar may respond to the voice input of the player, by a specific movement, a change of facial expression, and even a voice response. For this purpose, it is, of course, necessary that the game platform in use by the player may have a microphone such that the player's voice input may be communicated to the game engine which may then make the data edits to stream new data to the player and other players in order to display the responses of the avatar to whom voice input is directed. It is typical that platforms as shown in FIG. 1 have microphones.

In a circumstance of voice input by a player directed to a specific avatar, it is needed that the system recognize the player speaking and the avatar spoken to. The programming of the game or other video presentation has preprogrammed input for the player, and the player's voice input is anticipated. The responses of the avatar are also pre-programmed. The system will update the data stream for the avatar to perform whatever pre-programmed responses are associated with certain voice input.

In an embodiment of the invention with a game or video presentation in progress in which player voice input and virtual character response is programmed and enabled, it is necessary for the system to respond to a trigger event to begin listening for a player voice input. In one embodiment, the system may simply switch to "listening" mode at specific time intervals. Other triggers may comprise tracking which point on the screen a player may be looking or which point the player has concentrated activity. In another example, certain start words may trigger listening mode; for example, the player may say "Hey!" and the system in response will start a voice input-character response process.

In one embodiment, the system, when triggered, continues listening to the player until the player has stopped speaking, or until a predetermined time interval has been reached. In the case of a predetermined time interval, after the time expires the microphone starts listening for the specific start words again. Upon recognizing a trigger event, the system listens for the predetermined duration or until the user has stopped speaking. While the user is speaking, in-game responses are triggered based on the time interval of the speech.

A typical use case involves the system recognizing a trigger event. The system may display a script for the player to address to the virtual character identified as the target of the voice input. As the player begins to read the script from script displayed, rather than resorting through a voice recognition and a library of word and phases matched with character activity, the system simply tracks the players real-time position in the script and triggers the virtual character's responses accordingly. As a simple example, if the script describes details of a recent sporting event to an in-game character, the character may be caused to visibly shake the head when the user mentions a blown play or may widen the eyes with shock when the player explains how their team took the lead in the end. After the player reaches the end of the script and is finished speaking, there may be an interval where the character may speak a predetermined set of lines based on what the user said from the script, and then the system goes back to listening mode, looking for another trigger.

Figure 2:
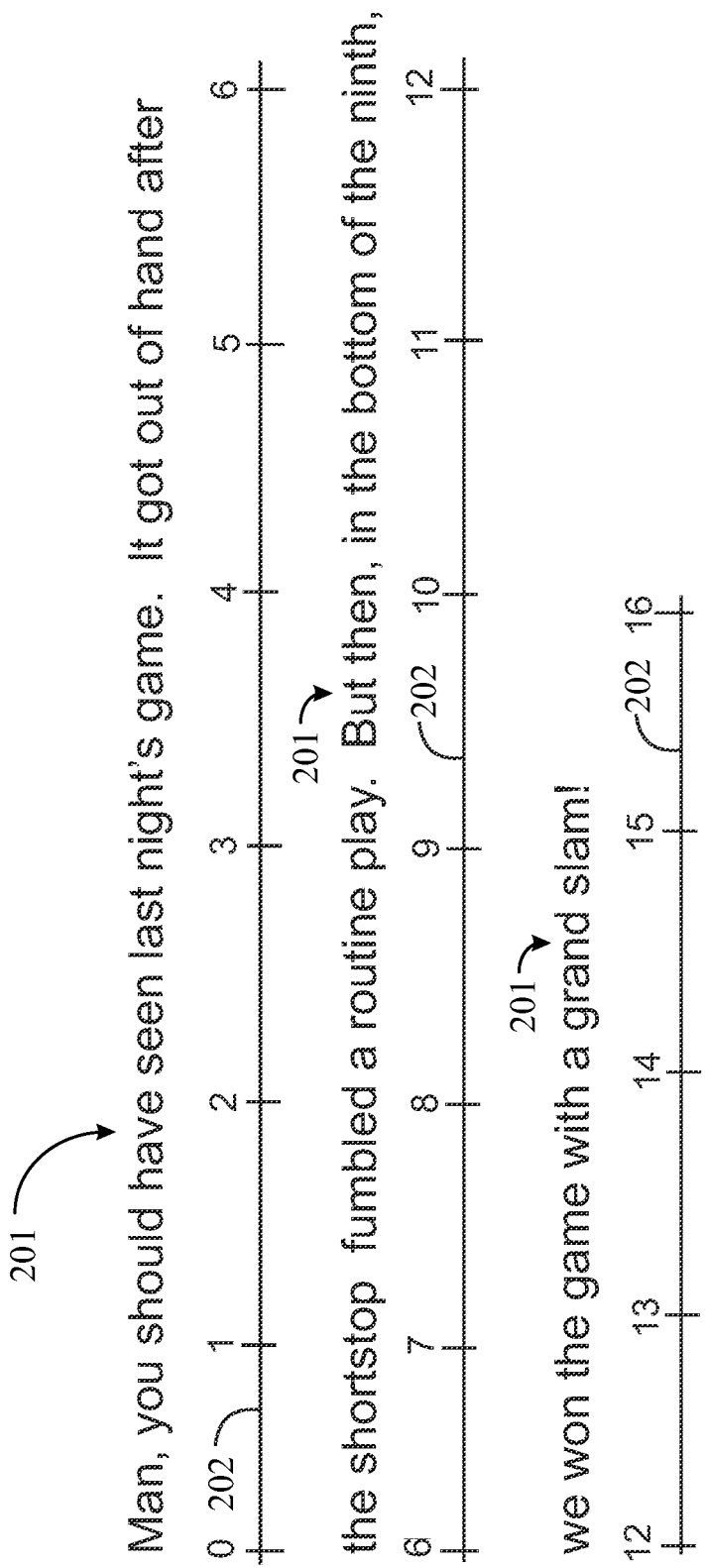
FIG. 2 is a diagram of a timeline associated with a spoken script in an embodiment of the invention.

FIG. 2 is a diagram of an example script 201 and a corresponding timeline 202 illustrating time passed from 0 to 16 seconds as a player speaks script 201. In this simple example, a player speaking at an "average" or 'typical' rate will take a bit over 15 seconds to speak the entire script. The first sentence completes at 4 seconds, the second sentence at about 9.5 seconds, and the third at just over 15 seconds.

Figure 3:
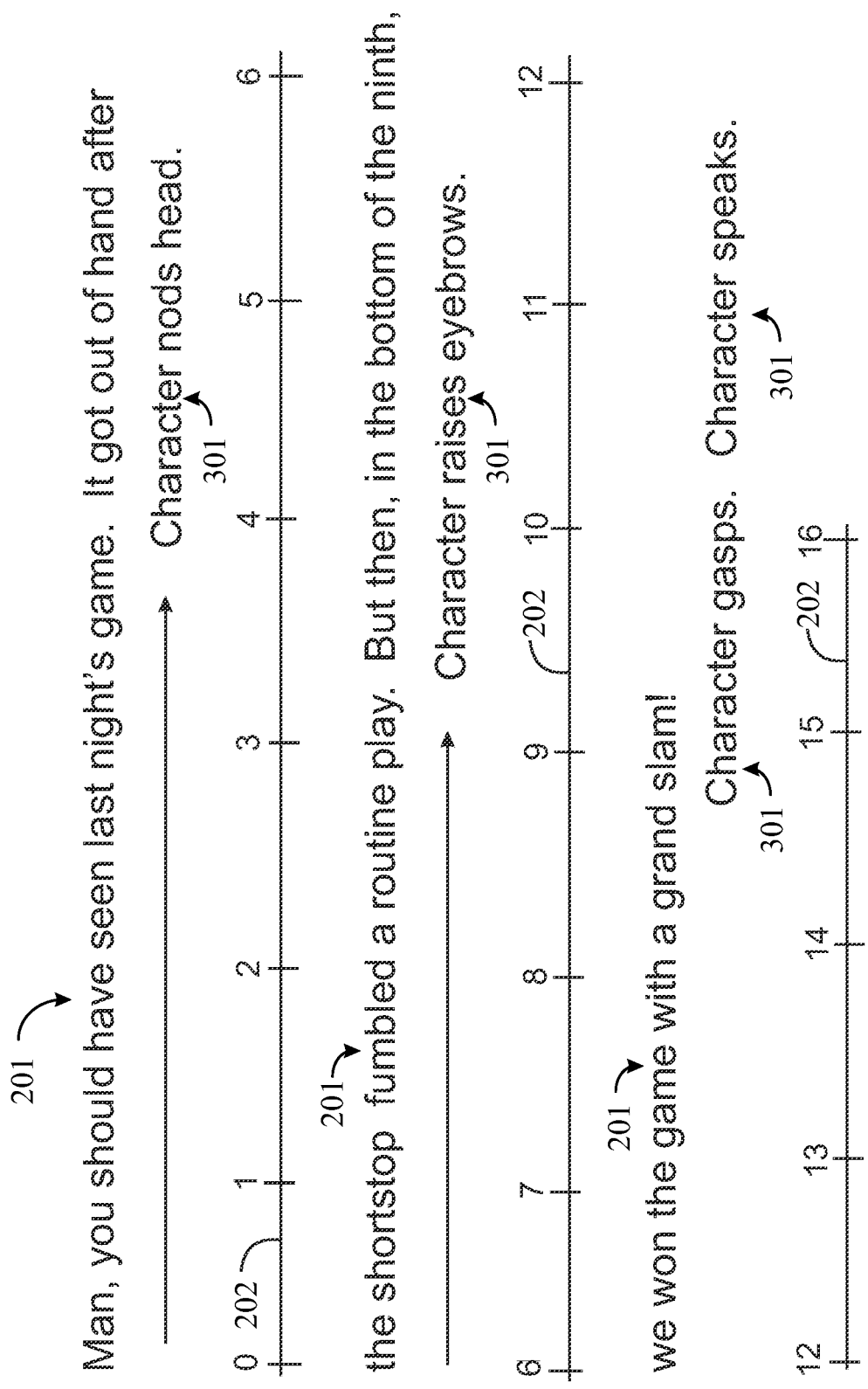
FIG. 3 is a diagram like that of FIG. 2, with character actions and responses associated with the timeline along with the spoken script.

In one embodiment, the system assumes the player talking speaks at the rate illustrated in FIG. 2 and controls the response of the virtual character accordingly. For example, the system may control the character to behave, as shown in FIG. 3, along the same example script 201. In FIG. 3, character responses and actions 301 are illustrated in words. At 4 seconds, after the player begins speaking, the system causes the character to nod the head, acknowledging that he or she said "you should have seen last night's game." At about 9 seconds, the system causes the character to raise the eyebrows in response to the speaking of "the shortstop fumbled a routine play." At about 15 seconds, the system causes the character to gasp and speak, in response to hearing "we won the game with a grand slam!"

Again, this example assumes the player speaks at a particular pre-assumed rate. This creates a problem because, in some circumstances, players may speak faster or slower than this assumed rate, the coordination may be awkward.

Referring back to FIG. 1, note that client data is stored in data repository 103. The clients are the players/users referred to in these examples. The system may track client voice input and store data points to indicate the speaking rate of each player and use this data to coordinate the character responses to specific players so that an "average" speaking rate might no longer be assumed and coordination may be better controlled.

Figure 4:
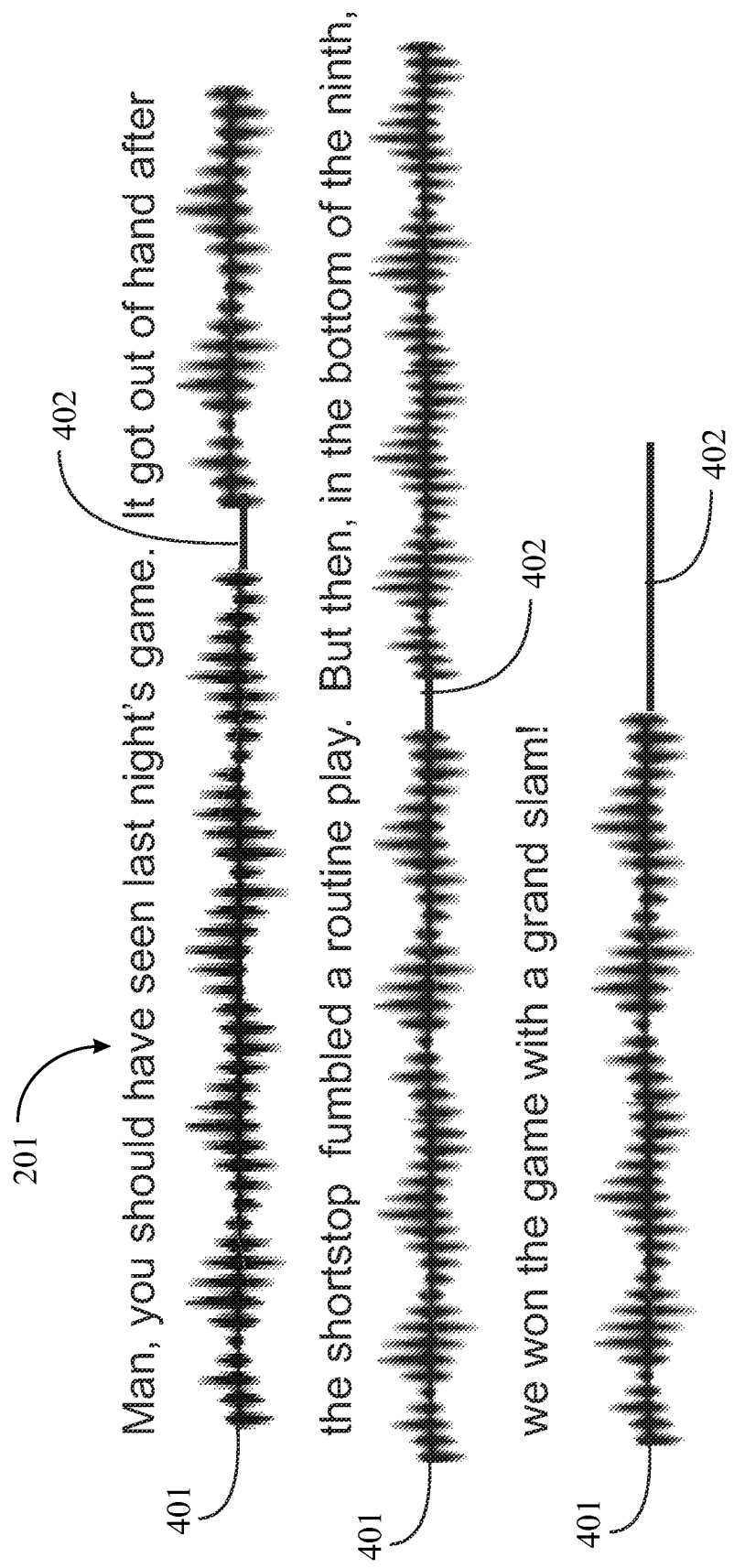
FIG. 4 is a diagram of the spoken script of FIG. 2 and FIG. 3 associated with an audio track of the script.

FIG. 4 is an example an audio track 401 on example script 201 of a player speaking the script of FIGS. 2 and 3. The variations in the audio track 401 may be monitored to determine number of syllables and words. In this particular example, the spaces 402 on the audio track 401 indicate the end of one sentence of example script 201 and the beginning of another. With proper coding, the system, knowing the script, can tell where the player speaking is in the script by the variations and quiet spaces in the audio track. The system may then control the virtual character's responses accordingly. This process is precise and does not rely on timing of a speaker.

Figure 5:
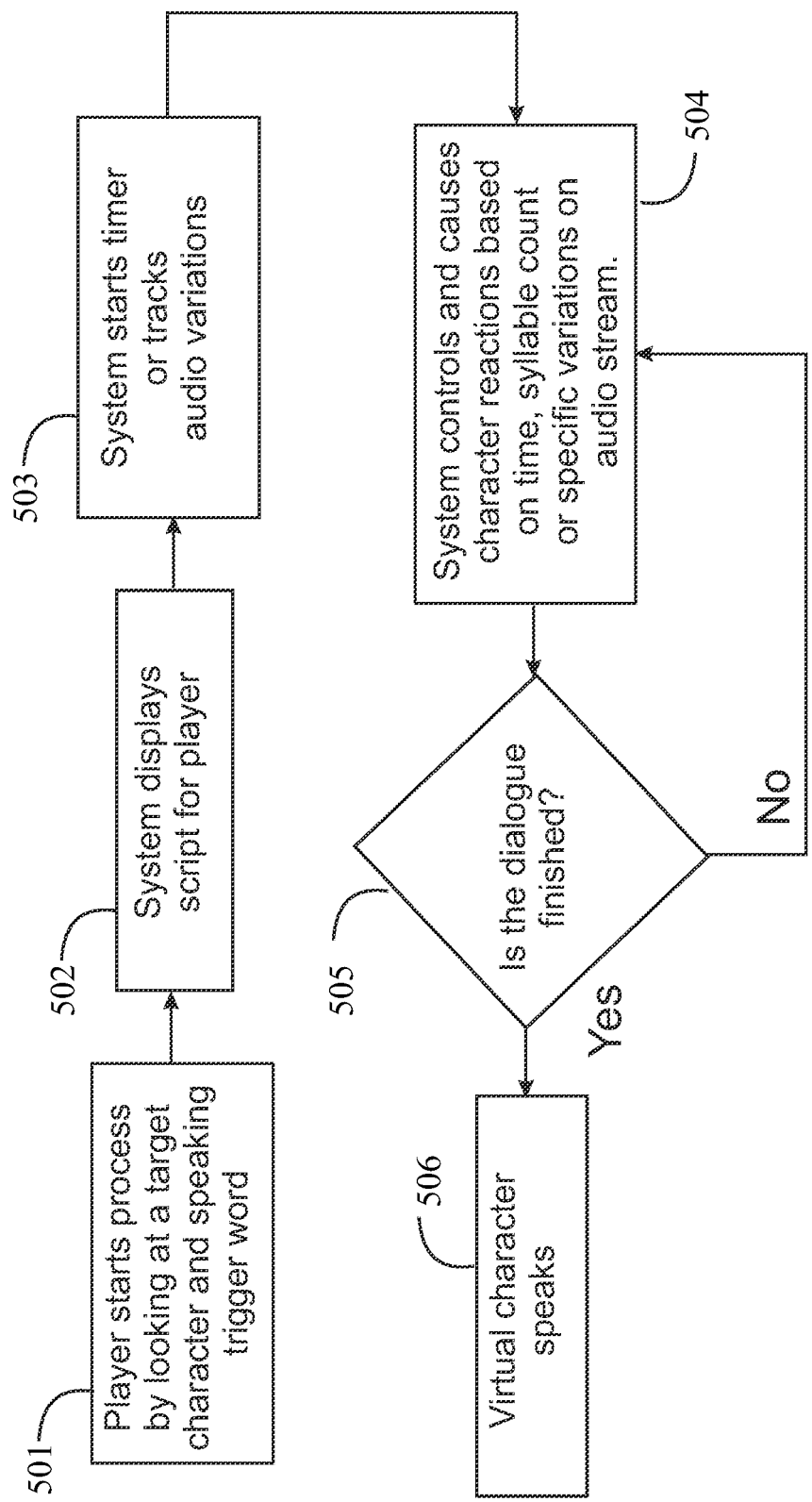
FIG. 5 is a flow diagram of a method in an embodiment of the invention.

FIG. 5 is a flow diagram depicting steps of a method for coordinating character responses and actions derived from spoken words and phrases by a player in an embodiment of the invention. At step 501 a player starts the process by looking at a target character and speaking a trigger word. The system displays a script for the player at step 502. The system starts a timer or tracks variations in an audio wave for the player at step 503. At step 504 the system controls and causes character reactions, such as facial expressions or gasps, based on time, syllable count, or specific variations in the audio stream. At step 505 the system determines if the dialogue is finished. This may be based on a pre-programmed silent period length. If the dialogue is over, the virtual character may make a final utterance and/or movements at step 506. If the dialogue is not over, the system continues control and causes character reactions based on time, syllable count, or specific variations in audio waves.

In another embodiment of the invention a method for dynamically adjusting the predicted timeline based on system recognition of keywords in a script is provided. In this method for adjusting the timeline to trigger actions, emotions or verbal responses of the virtual character are triggered at predicted times, but the predicted times for each response of action of the character is dynamically adjusted during the speaking of the script. In this method specific words in the script verbally input by the user are marked as keywords. There may be one keyword, two or more, or every word in the script may be a recognizable keyword.

At the beginning of the spoken script the predictions for times of uttering specific words and triggering actions of the virtual character are based on, in this example, the beginning predicted times may be an average standard, and there is no need to identify and access the particular profile for the speaking rate/pattern of the user identified that is speaking the script. As each keyword is uttered and recognized by the system, the system readjusts the predicted times. If there is just one keyword, the time that that keyword is uttered enables the system to determine the predicted timing for every word and event. If the user is consistent this may be adequate. However, if there are a plurality of keywords, the timing and predictions may be readjusted as the script plays out.

Figure 6:
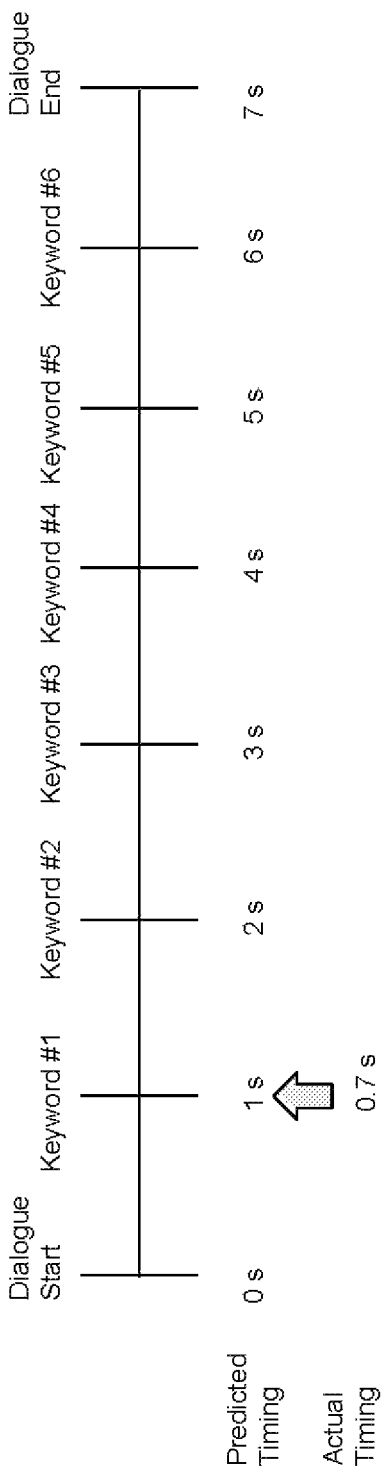
FIG. 6 is a diagram of a first example of time course correction based on key words.
Figure 7:
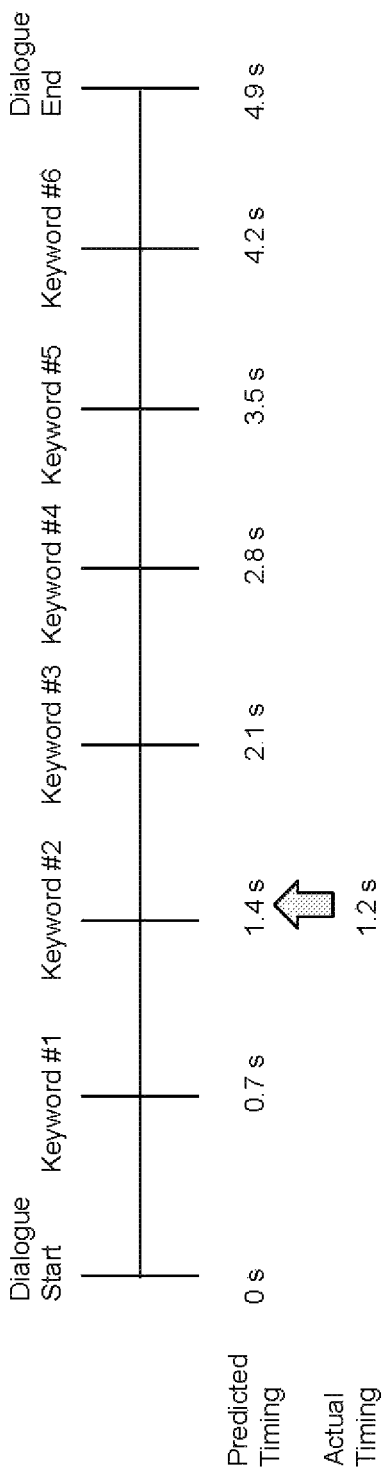
FIG. 7 is a diagram of a second example of time course correction based on key words.

FIG. 6 is a diagram of a first example of time course correction based on key words. The timeline shows six keywords and the predicted time of 1 second for uttering the first keyword. In this example the user reaches the first keyword in 0.7 seconds instead of the predicted 1 second. Accordingly, the adjusted predicted rate is calculated to be 5.71 syllables per second. The adjusted remaining time is calculated to be 4.20 seconds FIG. 7 is a diagram of a second example of time course correction based on key words. The second keyword is reached in 1.2 seconds instead of the newly predicted 1.4 seconds. The new APR is 6.6 syllables per second, and the ART is 3.00 seconds.

Figure 8:
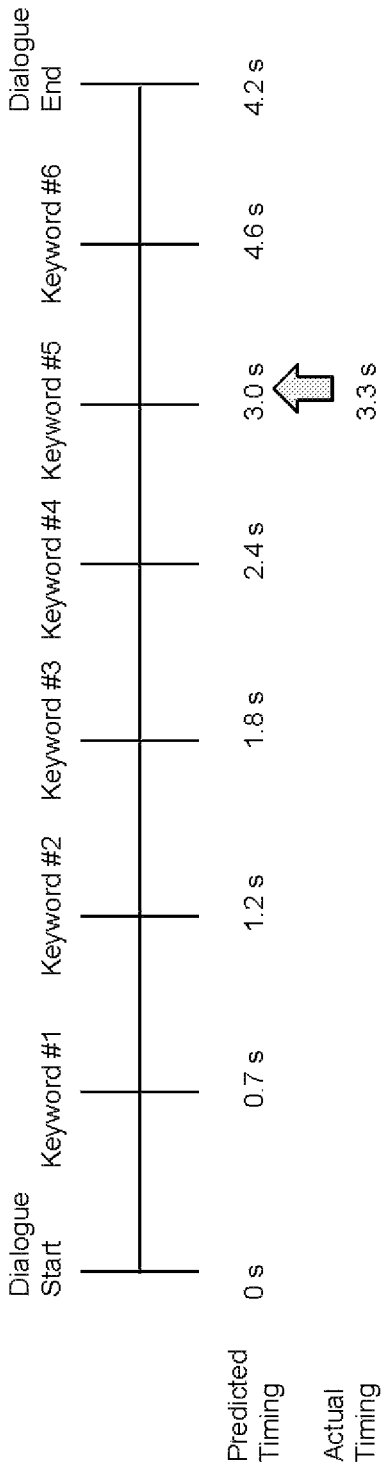
FIG. 8 is a diagram of a third example of time course correction based on key words.

FIG. 8 is a diagram of a third example of time course correction based on key words. The fifth keyword is reached in 3.3 seconds instead of the newly predicted 3.0 seconds. The new APR is 6.06 syllables per second, and the ART is 3.30 seconds.

Figure 9:
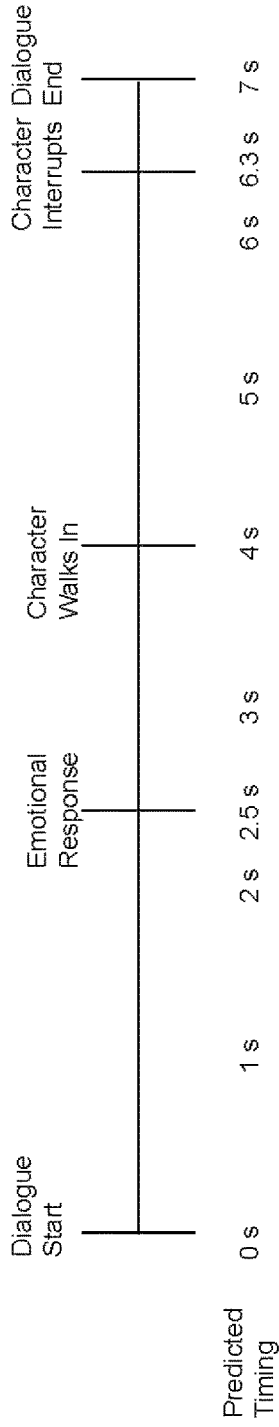
FIG. 9 is a diagram showing events on the original and adjusted timelines.
Figure 9:
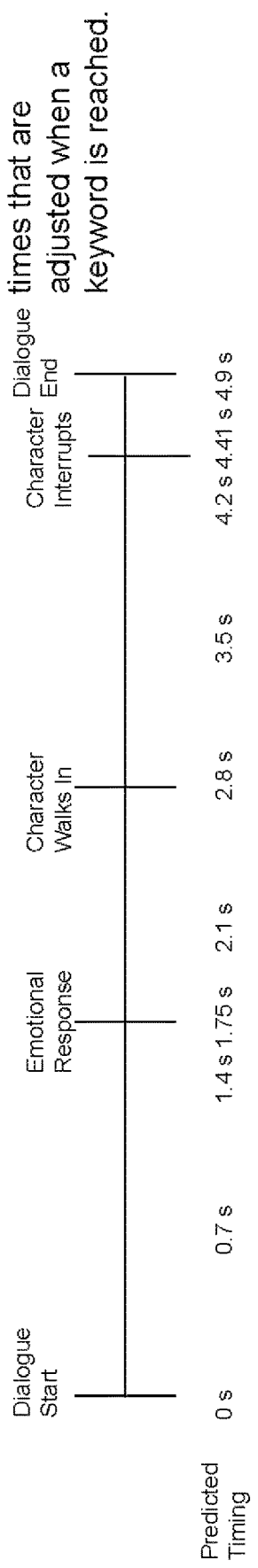

FIG. 9 is a diagram showing events on the original and adjusted timelines. The upper timeline is the original, based 28 syllables per second at 4 syllables per second. This shows how the timeline of events is adjusted based on the newly adjusted predicted rates and the adjusted predicted times based on times when specific keywords are reached.

In this method the timing of virtual character response, action, etc. is triggered based on the user's delivery of the script, even if the user changes his or her delivery rate and periods between syllables and sentences.

The skilled person will understand that the embodiments described above are exemplary and not specifically limiting to the scope of the invention. Many functions may be accomplished in different ways, and apparatus may vary in different embodiments. The invention is limited only by the scope of the claims.

The invention claimed is:

1. A method for coordinating reactions of a virtual character with script spoken by a user in any one of a video game and virtual reality (VR) presentation, comprising:

uniquely specifying specific keywords in the script;
making a first prediction of times for reaching individual keywords and for triggering responses by a virtual character,
displaying the script for the user on a display of a computerized platform used by the user, and prompting the player to speak the script;
sensing the time that the user reaches a first keyword;
recalculating the prediction of times for reaching individual following keywords and for triggering responses by a virtual character, based on the syllables in the script up to the first keyword and the actual time the user reaches the first keyword;
sensing the time that the user reaches a second keyword;
recalculating the prediction of times for reaching individual following keywords and for triggering responses by a virtual character, based on the syllables in the script up to the second keyword and the actual time the user reaches the second keyword;
continuing to sense times to keywords and recalculating the predicted times until a last keyword is reached; and
causing specific actions and responses of the virtual character according to the recalculated predictions of times.

2. The method of claim 1 further comprising a step for determining a start of a dialogue, wherein the system associates viewpoint of the player with a specific virtual character in the video game or VR presentation and selects a script accordingly.

3. The method of claim 1 further comprising a step for sensing that the dialogue is finished.

4. The method of claim 3 further comprising a step of playing any one of a verbal reaction and at least facial physical movement by the virtual character after the end of dialogue is sensed.

5. A system coordinating reactions of a virtual character with script spoken by a player in any one of a video game or VR presentation, comprising:

an internet-connected server executing software and streaming video games or presentations;
an internet-connected computerized platform used by a user, the platform having a display, a command input interface, and a microphone;
wherein the system uniquely species specific keywords in the script, makes a first prediction of times for reaching individual keywords and for triggering responses by a virtual character, displays the script for the user on a display of a computerized platform used by the user, and prompts the user to speak the script, senses the time that the user reaches a first keyword, recalculates the prediction of times for reaching individual keywords and for triggering responses by a virtual character, based on the syllables in the script up to the first keyword and the actual time the user reaches the first keyword, senses the time that the user reaches a second keyword, recalculates the prediction of times for reaching individual following keywords and for triggering responses by a virtual character, based on the syllables in the script up to the second keyword and the actual time the user reaches the second keyword, continues to sense times to keywords and recalculates the predicted times until a last keyword is reached, and causes specific actions and responses of the virtual character according to the recalculated predictions of times.

6. The system of claim 5 further comprising the system determining a start of a dialogue, wherein the system associates viewpoint of the player with a specific virtual character in the video game or VR presentation and selects a script accordingly.

7. The system of claim 5 wherein the system determines the dialogue is finished.

8. The system of claim 7 further comprising the system playing any one of a verbal reaction and at least facial physical movement by the virtual character after the end of dialogue is sensed.

* * * * *